United States Patent [19]

Fusco

[11] Patent Number: 5,274,946
[45] Date of Patent: Jan. 4, 1994

[54] WEEDGUARD FOR A CONVENTIONAL FISH HOOK

[76] Inventor: Thomas P. Fusco, 15 Reading Ave., Gloucester, N.J. 08030

[21] Appl. No.: 27,859

[22] Filed: Mar. 8, 1993

[51] Int. Cl.$^5$ .................................. A01K 83/00
[52] U.S. Cl. ................................ 43/43.2; 43/43.6
[58] Field of Search .............. 43/43.2, 43.4, 43.6, 43/42.4, 42.41, 42.42, 42.43, 42.44

[56] References Cited

U.S. PATENT DOCUMENTS

| | | | |
|---|---|---|---|
| 875,684 | 1/1908 | Biersach | 43/43.6 |
| 2,090,571 | 8/1937 | Coffin | 43/43.4 |
| 2,664,662 | 1/1954 | Larson | 43/43.6 |
| 3,274,726 | 9/1966 | Oney | 43/43.4 |
| 3,430,378 | 3/1969 | Sweeney | 43/43.6 |
| 3,465,466 | 9/1969 | Showalter | 43/43.6 |
| 4,926,579 | 5/1990 | Jimenez | 43/43.2 |

*Primary Examiner*—Paula A. Bradley
*Assistant Examiner*—Chuck Y. Mah

[57] ABSTRACT

An improved, two-part weedguard for a fish hook having as one part a U-shaped point guard (10) fashioned from a light-weight, rigid material. The point guard has a longitudinal channel (14) on its upper side in which the fish hook point is cradled. In addition, this channel is of sufficient volume and length so as to completely envelope the hook point, thereby protecting the hook point from fouling on weeds, cover, and other obstacles. The second part consists of a guard mount (22) fashioned from a single strand of resilient steel wire bent upon itself, forming a loop (24), two parallel arms (26) and two terminal ends (28). In addition, the mount has a right angle ward bend in the loop-bearing end. The guard and mount are joined by threading the terminal ends of the arms through two longitudinal through-holes (20) in the channel walls until the guard comes to rest on the ward bend and the loop. In addition, an intermediate bend (32) fixes the guard securely on the arms by entrapment between itself and the ward bend. The intermediate bend also functions as an adjustable hinge, permitting the maintainence of the optimal position of the point guard relative to the hook point throughout a wide range of tension adjustments to the weedguard. The arms incline upward toward and through the eye of the hook, terminating in an acute primary bend (34) and attaching fingers, said fingers being anchored to the hook shank. The primary bend rests on the inside edge of the eye and acts as a resilient, yielding hinge, allowing the guard and mount assembly to flex toward and from the shank.

1 Claim, 1 Drawing Sheet

WEEDGUARD FOR A CONVENTIONAL FISH HOOK

BACKGROUND

1. Field of Invention

This invention relates to weedless fish hooks, specifically to an improved weedguard for a fish hook.

2. Description of Prior Art

Originally, weedguards constructed from wire were mounted on hooks to aid anglers in pursuing fresh water gamefish in and around weeds, brush, and other submerged obstacles. These wire constructions are intended to protect a baited hook from fouling on such obstacles until a fish takes the baited hook in its mouth. Then the action of the angler pulling on the line or "setting the hook" causes the weedguard to come in contact with the inside of the fish's mouth. The weedguard is thus deflected thereby exposing the hook point and enabling it to pierce the fish.

After experimenting with all available weedless hooks over a period of time, I have discovered that few if any of these hooks are able to cope with all the various types of weeds, cover, and underwater obstacles encountered by the angler. It has further been discovered that most if not all available wire weedguards on occasion fail to disengage as intended when an angler attempts to set the hook on a fish. This failure is a result of the wire weedguard becoming entangled around the hook's point and/or becoming trapped behind the hook's barb. The result is numerous lost fish.

All wire weedguards heretofore known suffer from one or more of a number of disadvantages:

(a) They allow the hook point to remain exposed in some degree to the underwater environment. This permits weeds to enter laterally behind the wire construction and become embedded on the hook point. This wastes valuable fishing time and ruins what might otherwise be a perfect bait presentation.

b) On occasion, the weedguard is deflected laterally instead of vertically when it encounters an obstacle or a fish's mouth. This lateral deflection causes the weedguard to disengage prematurely, or to roll over the hook point while the weedguard is still engaged. In the latter instance, the still-engaged weedguard then halts the progress of the point's penetration into the fish's mouth. Since the point cannot penetrate down to the hook's barb, the fish is free to wriggle off the hook. This results in numerous lost fish.

c) The tension of the weedguard cannot be adjusted without altering the position of the guard relative to the hook point. This makes it impossible to achieve a consistency of performance while allowing for a wide range of tension adjustments.

d) They have poor lateral stability, causing them to become twisted and bent easily. Most available weedguards become so distorted after catching only a few fish that they are rendered useless and must be discarded.

e) Because of the limitations inherent in their design, these weedguards are usually effective only when mounted onto long shank, narrow-gap hooks. However, such hooks are the least efficient at hooking and holding large-mouthed fish such as the black bass.

f) As mentioned above, these weedguards are normally mounted onto long shank, narrow-gap hooks. The geometry of such an assembly causes the deflecting arm(s) of the weedguard to be more or less in line with the direction of pull that the angler imparts on the fishing line. This arrangement occasionally results in the weedguard sliding over the interior of the fish's mouth without deflecting.

OBJECTS AND ADVANTAGES

Accordingly, several objects and advantages of my invention are:

a) to provide a weedguard which completely envelopes the hook point, thereby protecting it on all sides from fouling on weeds, cover, and other submerged obstacles;

b) to provide a weedguard which will open properly when laterally deflected, thereby effectively preventing weedguard "roll-over" and all the ensuing problems associated with it;

c) to provide a weedguard that will permit a wide range of tension adjustment while maintaining the optimal position of the weedguard relative to the hook point, thereby producing a greatly improved consistency of performance;

d) to provide a weedguard with excellent lateral stability so as to resist distortion under load, thereby greatly increasing it's life span;

e) to provide a weedguard that is effective when mounted on a short shank, wide-gap hook, such hooks being most effective at hooking and holding large-mouthed fish such as the black bass;

f) to provide a weedguard that when mounted to a fish hook is more or less opposed to the direction of pull of the fishing line, thereby causing the weedguard to more readily deflect in the fish's mouth.

Further objects and advantages will become apparent from a consideration of the ensuing description and drawings.

DRAWING FIGURES

Figure 1:
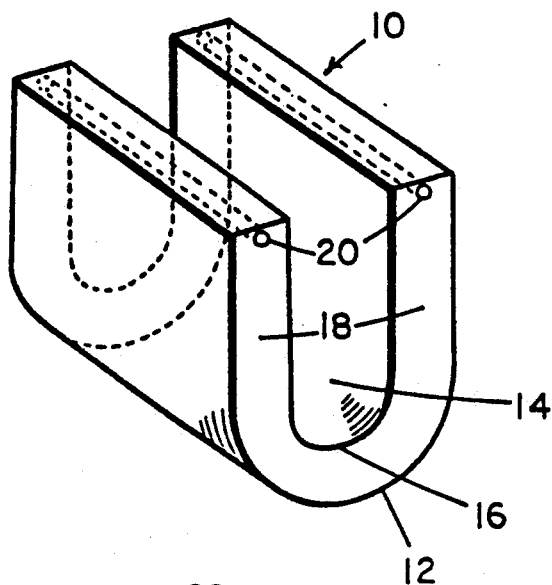
FIG. 1 shows a perspective view of a point guard with a longitudinal channel and through-holes.

| Reference Numerals In Drawings | |
|---|---|
| 10 point guard | 12 outer radius |
| 14 longitudinal channel | 16 inner radius |
| 18 channel walls | 20 longitudinal through holes |
| 22 guard mount | 24 loop |
| 26 co-planar arms | 28 terminal ends |
| 30 ward bend | 32 intermediate bend |
| 34 primary bend | 36 attaching fingers |
| 38 eye | 40 shank |
| 42 return bend | 44 barb |
| 46 point | 48 wrapping |

DESCRIPTION—FIGS. 1 TO 4

A typical embodiment of the point guard of the present invention is illustrated in FIG. 1. It is denoted generally by the numeral 10. In the preferred embodiment, guard 10 is formed using standard machining practices from acetal plastic, which is available from AIN Plastics of North Brunswick, N.J. However, guard 10 can also be fashioned by way of standard extrusion or injection molding processes. Additionally, guard 10 can consist of any other material that is water resistant, machinable, of sufficient hardness to resist penetration by a sharp hook point, light weight, and has the requisite rigidity without brittleness such as nylon, reenforced polycarbonate, high impact styrene, polyvinyl chloride, aluminum, etc.

Guard 10 (FIG. 1), is fashioned from a single bar of acetal plastic. The bar is typically 0.156"H×0.152"W. The requisite length is determined by the size and style of hook on which the finished point guard will ultimately be mounted. An outer radius 12 is formed on a narrow side of the bar (0.152") along its entire length. A longitudinal channel 14, typically 0.125"H×0.062"W, is cut in the side opposite radius 12 along the entire length of the bar, forming an inner radius 16 and channel walls 18. A longitudinal through-hole 20 is drilled through each wall 18 in the uppermost end opposite the radii.

Figures 2, 3:
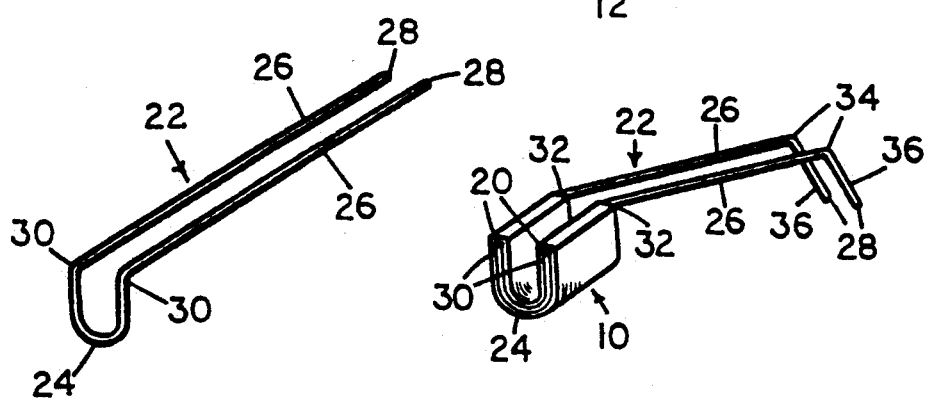
FIG. 2 shows a perspective view of a wire point guard mount with arms and a loop.
FIG. 3 shows a perspective view of a complete weedguard assembly consisting of the point guard and the guard mount, with primary and intermediate bends and attaching fingers.

FIG. 2 shows a perspective view of the guard mount. It is denoted generally by the numeral 22. It is fashioned from a single length of stainless steel, resilient wire of requisite gauge. The wire is bent upon itself midway between its ends, forming a loop 24, a pair of co-planar arms 26, and terminal ends 28. A distance equal to slightly less than the height of guard 10 (FIG. 1) is measured in from the loop-bearing end of guard 22 where a right angle ward bend 30 is formed.

FIG. 3 shows a perspective view of the complete weedguard assembly. Ends 28 of mount 22 are threaded into through-holes 20 in guard 10 until guard 10 comes to rest against bend 30 and loop 24. Loop 24 is made to come to rest on guard 10 at a position midway between radius 12 and radius 16. An intermediate bend 32 is formed in mount 22 in such a manner as to entrap guard 10 firmly between bend 30 and bend 32. A primary bend 34 is formed in mount 22 near ends 28 forming attaching fingers 36.

Figure 4:
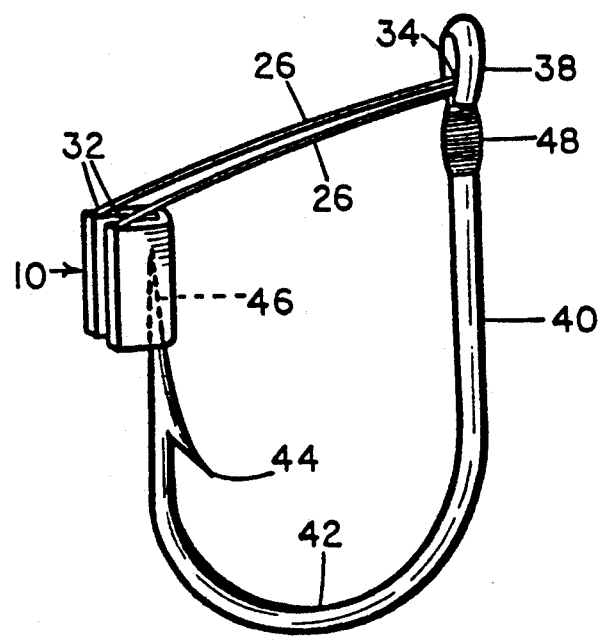
FIG. 4 shows a perspective view of a fish hook equipped with the complete weedguard assembly.

FIG. 4 shows a perspective view of the weedguard assembly mounted on a conventional fish hook having a line-attaching eye 38, a shank 40, a curvate return bend 42, a barb 44, and a spearing point 46. The weedguard assembly is mounted on the hook by threading ends 28 through eye 38 in such a manner as to position bend 34 on the inside edge of eye 38 and affixing fingers 36 to the eye-bearing end of shank 40 with a wrapping 48 of thin wire or nylon monofilament line. This construction might be varied by gluing or welding fingers 36 to shank 40. Bends 34 and 32 are then adjusted or bent in a co-operative manner so as to cause arms 26 to bridge the gap between eye 38 and point 46, and to cause guard 10 to cradle point 46 midway between walls 18, with the innermost edge of point 46 resting on radius 16. Further adjustment is made so that point 46 extends upward into channel 14 to a distance of approximately 75% of the length of channel 14, and that the outermost edge of point 46 is more or less parallel with through-holes 20.

From the description above, a number of advantages of my improved weedguard become evident:

a) The use of a point guard with channel walls causes the hook point to be completely enveloped, thereby protecting the point on all sides from fouling on weeds, cover, and other submerged obstacles.

b) The use of a point guard with channel walls effectively prevents the possibility of weedguard roll-over due to lateral deflection while in a fish's mouth. Instead, lateral deflection will simply result the in opening of the weedguard in the desired manner, enabling the hook point to penetrate the fish down past the barb. In addition, the use of a point guard with channel walls also prevents the wire arms from becoming entangled with the hook point and/or barb.

c) The use of an adjustable intermediate bend in co-operation with a point guard enables the angler to maintain the optimal position of the weedguard relative to the hook point while allowing for a wide range of tension adjustments.

d) The use of two arms anchored to a point guard adds significantly to the weedguard's lateral stability so as to resist distortion under load, thereby greatly increasing its life span.

e) The use of an adjustable intermediate bend in co-operation with a point guard with channel walls results in a weedguard of such versatility that it can be effectively utilized with a much wider variety of fish hook styles, including a short shank, wide-gap hook. In fact, the above described weedguard would still be effective if mounted on a hook whose point is virtually level with its eye; this would not be possible with other weedguard designs currently available.

f) The use of a point guard elevates the weedguard arms, so that the angle between the arms and the hook shank is less acute than with other weedguard designs. This results in the improved weedguard being more or less opposed to the direction of pull of the fishing line, thereby causing the weedguard to be more readily deflected in the fish's mouth.

OPERATIONS—FIGS. 1, 3, 4

The manner of operating the improved weedguard is similar to that of other weedguards currently available. The angler depresses arms 26 (FIG. 4), first inwardly toward shank 40, then laterally until guard 10 is free of point 46. This is known as the sprung or open position. The angler can now place on the hook any type of live or artificial bait that he or she chooses such as shiner minnows, frogs, pork baits, plastic worms, etc. The angler then reverses the above procedure to re-engage guard 10 to point 46. This is known as the set or closed position. The angler can now proceed to fish with the baited hook in the usual manner.

The manner in which the weedguard tension is adjusted is similar to that of other weedguards currently available. Tension adjustment is made with the weedguard in the open position. Sufficient pressure is applied to arms 26 in a direction co-planar with shank 40 (FIG. 4) to alter the angle of bend 34. To increase tension, arms 26 are pressed in a direction away from shank 40; to decrease tension, arms 26 are pressed toward shank 40.

The manner in which the optimal position of the point guard relative to the hook point is maintained throughout a wide range of tension adjustments is unique to the present invention. In the optimal relative position, point 46 extends upward into channel 14 of guard 10 to a distance of approximately 75% of its length (FIGS. 1, 4). However, increasing or decreasing the weedguard tension changes the relative position of guard 10, so that point 46 may, for example, extend upward only 50% into channel 14, or extend upward through channel 14 beyond the perimeter of guard 10. In each case, guard 10 can be adjusted back to its optimal position by altering the angle of bend 32. Adjustment to bend 32 is accomplished by applying pressure to the loop-bearing end of guard 10 in a direction co-planar with shank 40. Pressing toward shank 40 raises the relative position of guard 10; pressing away from shank 40 lowers its relative position. In this manner, the optimal position of guard 10 can be maintained throughout a wide range of tension adjustments.

The manner in which the weedguard operates after a fish takes the baited hook in its mouth is identical to that of other weedguards currently available. The angler pulls on the fishing line, causing the hook to travel through the fish's mouth. As the hook is traveling, arms 26 (FIG. 4) encounter the interior of the fish's mouth causing the weedguard to deflect toward shank 40. This deflection opens the weedguard and exposes point 46, which then pierces the mouth, successfully impaling the fish.

CONCLUSION, RAMIFICATIONS, AND SCOPE

Accordingly, the reader will see that the weedguard of this invention is easy to use, extremely durable, and is highly practical and effective at protecting the hook point from all types of weeds, cover, and other submerged obstacles. Furthermore, the point guard, in co-operation with the intermediate bend and the two co-planar arms has the additional advantages in that it provides a weedguard with superior protection from weeds, cover, and other obstacles by complete envelopment of the hook point;

it provides a weedguard that will not become entangled with the hook point and/or barb, and that will open properly when laterally deflected in a fish's mouth by eliminating the possibility of weedguard roll-over;

it provides a weedguard with an effective means of maintaining its optimal position relative to the hook point throughout a wide range of tension adjustments;

it provides a weedguard with a greatly increased life span by furnishing exceptional lateral stability under load so as to resist distortion;

it provides a weedguard with tremendous versatility by permitting such a wide range of adjustment that it can be effectively utilized with a much greater variety of hook styles;

it provides a weedguard that is more easily deflected and opened when an angler sets the hook in a fish by being mounted at an angle more opposed to the direction of pull of the fishing line.

While the above description contains many specificities, these should not be construed as limitations on the scope of my invention, but rather as an exemplification of one preferred embodiment thereof. Many other variations are possible. For example, the point guard can have other shapes, such as V-shaped, cylindrical, scoop-shaped, etc. It can have a side and/or top profile which is trapezoidal, triangular, oval, D-shaped, etc. It can be fashioned from different materials and in different sizes. It can be attached to the guard mount by different means, such as gluing the mount arms into external longitudinal grooves along the sides of the point guard, inserting the mount into an injection mold for the point guard, etc. The entire weedguard assembly can be molded as a single plastic article, with internal wire re-enforcements, etc.

Thus, the scope of the invention should be determined not by the embodiment illustrated, but by the appended claims and their legal equivalents.

I claim:

1. A weedguard for protecting from underwater obstacles a conventional fish hook having a shank with a line attaching eye at its upper end and a curvate return bend at its lower end terminating in a spearing point having a rearwardly placed lateral barb, said weedguard comprising:
   a. two resilient co-planar arms of equal length, each having an upper and lower end and being of sufficient length so as to substantially bridge the gap between upper end of said shank and said spearing point,
   b. a point guard comprising a bar of substantially rigid material of a predetermined length and cross-sectional size, having at its upper side a longitudinal channel having two channel walls of equal size, said channel walls being of sufficient height and length so as to substantially envelope said spearing point,
   c. said channel walls means for having each joining said walls to adjacent said lower end of each said arm at an adjustable angle,
   d. said upper ends of said arms having means for co-attaching said arms to the upper end of said shank at an adjustable angle,
   e. said angles at said upper and lower ends of said arms being adjustable in a co-operative manner so as to substantially position said spearing point midway between said channel walls.

* * * * *